US006972815B2

(12) United States Patent
Kanbe et al.

(10) Patent No.: US 6,972,815 B2
(45) Date of Patent: Dec. 6, 2005

(54) DISPLAY DEVICE

(75) Inventors: Makoto Kanbe, Sakurai (JP); Kazuhiko Tsuda, Ikoma (JP); Sayuri Fujiwara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/619,783

(22) Filed: Jul. 16, 2003

(65) Prior Publication Data

US 2004/0013822 A1 Jan. 22, 2004

(30) Foreign Application Priority Data

Jul. 19, 2002 (JP) ............................ 2002-210969

(51) Int. Cl.[7] ............................................ G02F 1/1335
(52) U.S. Cl. ..................................................... 349/114
(58) Field of Search ................................ 349/113, 114

(56) References Cited

U.S. PATENT DOCUMENTS

| | | | | |
|---|---|---|---|---|
| 5,764,324 A | | 6/1998 | Lu et al. | |
| 6,195,140 B1 | | 2/2001 | Kubo et al. | |
| 6,683,667 B2 | * | 1/2004 | Jin et al. | 349/113 |
| 2001/0012085 A1 | * | 8/2001 | Johnson et al. | 349/143 |
| 2003/0117553 A1 | * | 6/2003 | Yamada | 349/113 |
| 2003/0156239 A1 | * | 8/2003 | Inoue et al. | 349/113 |
| 2003/0156240 A1 | * | 8/2003 | Oda et al. | 349/113 |
| 2003/0206256 A1 | * | 11/2003 | Drain et al. | 349/113 |
| 2003/0210369 A1 | * | 11/2003 | Wu | 349/114 |
| 2004/0004686 A1 | * | 1/2004 | Ogawa et al. | 349/114 |

FOREIGN PATENT DOCUMENTS

JP 11-101992 4/1999

OTHER PUBLICATIONS

F. Nuesch et al., “A Photoelectron Spectroscopy Study on the Indium Tin Oxide Treatment by Acids and Bases,” Applied Physics Letters, Vol. 74, No. 6, Feb. 8, 1999, pp. 880-882.
K. Sugiyama et al., “Dependence of Indium-Tin-Oxide Work Function on Surface Cleaning Method as Studied by Ultraviolet and X-Ray Photoemission Spectroscopies,” Journal of Applied Physics, Vol. 87, No. 1, Jan. 1, 2000, pp. 295-298.

* cited by examiner

*Primary Examiner*—James A. Dudek
(74) *Attorney, Agent, or Firm*—Nixon & Vanderhye P.C.

(57) ABSTRACT

A display device includes: a display medium layer; and a first electrode and a second electrode, which face each other with the display medium layer interposed between them. The first electrode includes: a first conductive layer; and a first polymer film, which covers the first conductive layer and which makes contact with the display medium layer. The second electrode includes: a second conductive layer; and a second polymer film, which covers the second conductive layer and which makes contact with the display medium layer. At least a portion of the first conductive layer has a different work function from the second conductive layer. The number of benzene rings included in each of the first and second polymer films is 0.4 or less for a molecular weight of 100.

22 Claims, 5 Drawing Sheets

DISPLAY DEVICE

BACKGROUND OF THE INVENTION

1. Field of the Invention

The present invention generally relates to a display device and more particularly relates to a display device in which two electrodes, arranged to face each other with a display medium layer interposed between them, include conductive layers with mutually different work functions.

2. Description of the Related Art

Various types of office automation (OA) equipment, such as personal computers with displays, have rapidly reduced their sizes and weights so significantly these days as to carry or move them to anywhere we like. But their manufacturing costs have not been successfully decreased as fast, or as significantly, as their sizes and weights. Accordingly, under the current circumstances, it is one of the most important and most pressing tasks to reduce the manufacturing cost of a display device.

A display device normally has a configuration in which a pair of electrodes is arranged so as to face each other with a display medium layer, exhibiting electrooptical properties, interposed between them. Such a display device conducts a display operation by applying a voltage to the display medium layer (i.e., creating a potential difference between the electrodes). The display medium layer may be made of a liquid crystal material, an electroluminescent material, a plasma or an electrochromic material, for example. Among other things, liquid crystal displays (LCDs), using a liquid crystal material for the display medium layer, have been popularized faster and more extensively than any other type of display device, because LCDs can conduct a display operation at relatively low power consumption.

Recently, however, demand for LCDs with even lower power dissipation has been escalating. To meet such demand, reflective LCDs using external light for display purposes have been researched and developed more and more extensively as replacements for transmissive LCDs that usually need a backlight.

Reflective LCDs are currently used in numerous types of mobile telecommunications units including cell phones. Meanwhile, reflective LCDs with a secondary light source, contributing to allowing the user to perceive a displayed image under any environment, have also been developed. Such a reflective LCD with a secondary light source may have one of the following two configurations.

One of the two possible configurations utilizes a front light method in which incoming light, which has been laterally incident onto the side surfaces of the reflective LCD, are uniformly introduced into the reflective LCD by way of a light guiding member. Specifically, in this configuration, the light guiding member is provided on the frontmost surface of the LCD (i.e., closest to the viewer) and a light source such as a cold cathode tube or an array of LEDs, which is normally used as a backlight, is provided on the right- and left-hand sides of the LCD.

In the other configuration, each of multiple pixel electrodes included in a reflective LCD is provided with a transparent electrode region and a backlight is provided on the back surface of the display (i.e., on the other side of the display opposite to the viewer (or front) side). An LCD having such a configuration can perform both the function of a reflective LCD and that of a transmissive LCD, and is sometimes termed a "semi-transmissive" type.

In each of the reflective LCDs described above, a counter electrode is provided on the surface of a counter substrate so as to face a liquid crystal layer. The counter electrode normally includes a transparent conductive layer made of ITO, for example, and an alignment film. On the other hand, on an active-matrix substrate including switching elements such as TFTs and pixel electrodes thereon, a reflective conductive layer, having a reflective function and including at least Al, for example, and another alignment film are normally provided so as to face the liquid crystal layer, too. In this case, the alignment films provided for the counter substrate and the active-matrix substrate both cover their associated conductive layers and both make contact with the liquid crystal layer. It should be noted that a member that includes a conductive layer and a polymer film and that makes direct contact with the display medium layer to apply a voltage thereto will be referred to herein as an "electrode".

In such a reflective LCD, conductive layers with mutually different work functions are provided for the counter substrate and the active-matrix substrate. In that case, if the conductive layers having mutually different work functions are arranged on the counter substrate and the active-matrix substrate so as to face each other, then an electrode potential difference will be created between the two conductive layers due to the difference in work function as shown in FIG. 10. In such an LCD, an offset voltage is normally added to an AC voltage applied to the liquid crystal layer such that a DC voltage component, produced by the electrode potential difference, is not applied to the liquid crystal layer.

However, in such an arrangement in which the conductive layers with different work functions are provided for the counter substrate and the active-matrix substrate, even if the offset voltage is added, the DC voltage component may sometimes be added to the liquid crystal layer during the operation of the LCD.

The present inventors discovered via experiments that such a DC voltage component was produced due to optically induced deterioration of the alignment films. Specifically, when the alignment films on the pixel electrodes and on the counter electrode deteriorate optically, the apparent electrode potentials of the pixel and counter electrodes will both change, thus creating a difference between the electrode potentials of the pixel and counter electrodes. As a result, the DC voltage component is applied to the liquid crystal layer. This phenomenon occurs when the two opposed conductive layers have mutually different work functions.

When the DC voltage component is applied to the liquid crystal layer due to the creation of the electrode potential difference between the pixel and counter electrodes as described above, the brightness will change at short intervals to produce a flicker and deteriorate the display quality significantly. Also, if the DC voltage component is continuously applied to the liquid crystal layer for a long time, then the reliability of the liquid crystal material might be risked.

To understand this phenomenon as resulting from the difference between electrode potential levels, a member including the conductive layer and the alignment film will be referred to as an "electrode". The difference in electrode potential level between two associated electrodes may be obtained by a flicker minimization method to be described later. It should be noted that the "electrode potential" of a conductive layer herein means an electrode potential that is unique to the material of the conductive layer.

SUMMARY OF THE INVENTION

In order to overcome the problems described above, preferred embodiments of the present invention provide a display device, in which two electrodes, arranged so as to face each other with a display medium layer interposed between them, include conductive layers with mutually different work functions and which can minimize the deterioration in display quality even when exposed to light.

A display device according to a preferred embodiment of the present invention preferably includes: a display medium layer; and a first electrode and a second electrode, which face each other with the display medium layer interposed between them. The first electrode preferably includes: a first conductive layer; and a first polymer film, which covers the first conductive layer and which makes contact with the display medium layer. The second electrode preferably includes: a second conductive layer; and a second polymer film, which covers the second conductive layer and which makes contact with the display medium layer. At least a portion of the first conductive layer preferably has a different work function from the second conductive layer. The number of benzene rings included in each of the first and second polymer films is preferably 0.4 or less for a molecular weight of 100.

In one preferred embodiment of the present invention, the first and second polymer films preferably exhibit a transmittance of about 97% or more with respect to incoming light having a wavelength of about 400 nm to about 500 nm.

In another preferred embodiment, the first conductive layer is preferably a reflective conductive layer and the second conductive layer is preferably a transparent conductive layer.

In this particular preferred embodiment, the display device preferably further includes another transparent conductive layer, which is provided as a third conductive layer in the first electrode.

In still another preferred embodiment, the display medium layer preferably includes a liquid crystal material, and the first and second polymer films are preferably alignment films.

In yet another preferred embodiment, a voltage being applied to the display medium layer for display purposes is preferably updated at a frequency of about 45 Hz or less.

In yet another preferred embodiment, the transparent conductive layer preferably includes ITO, and the reflective conductive layer preferably includes Al.

In yet another preferred embodiment, an AC voltage, which includes an additional offset voltage and which changes its polarity at regular intervals, is preferably applied to the display medium layer.

In yet another preferred embodiment, a variation in potential difference between potential levels of the first and second electrodes right after the device has been exposed to light is preferably about 10% or less of a voltage that is applied to display a grey-scale tone.

A mobile electronic appliance according to a preferred embodiment of the present invention preferably includes the display device according to any of various preferred embodiments of the present invention described above.

A display device according to another preferred embodiment of the present invention preferably includes: a display medium layer; and a first electrode and a second electrode, which face each other with the display medium layer interposed between them. The first electrode preferably includes: a first conductive layer; and a first polymer film, which covers the first conductive layer and which makes contact with the display medium layer. The second electrode preferably includes: a second conductive layer; and a second polymer film, which covers the second conductive layer and which makes contact with the display medium layer. At least a portion of the first conductive layer preferably has a different work function from the second conductive layer. A variation in potential difference between potential levels of the first and second electrodes right after the device has been exposed to light is preferably about 10% or less of a voltage that is applied to display a grey-scale tone.

In one preferred embodiment of the present invention, the display medium layer preferably includes a liquid crystal material, and the variation in potential difference preferably has an absolute value of at most about 250 mV.

In this particular preferred embodiment, the variation in potential difference preferably has an absolute value of at most about 30 mV.

In another preferred embodiment, the number of benzene rings included in each of the first and second polymer films is preferably 0.4 or less for a molecular weight of 100.

In still another preferred embodiment, the first and second polymer films preferably exhibit a transmittance of about 97% or more with respect to incoming light having a wavelength of about 400 nm to about 500 nm.

In yet another preferred embodiment, the first conductive layer is preferably a reflective conductive layer and the second conductive layer is preferably a transparent conductive layer.

In this particular preferred embodiment, the display device preferably further includes another transparent conductive layer, which is provided as a third conductive layer in the first electrode.

In yet another preferred embodiment, the first and second polymer films are preferably alignment films.

In yet another preferred embodiment, a voltage being applied to the display medium layer for display purposes is preferably updated at a frequency of about 45 Hz or less.

In yet another preferred embodiment, the transparent conductive layer preferably includes ITO, and the reflective conductive layer preferably includes Al.

In yet another preferred embodiment, an AC voltage, which includes an additional offset voltage and which changes its polarity at regular intervals, is preferably applied to the display medium layer.

A mobile electronic appliance according to another preferred embodiment of the present invention preferably includes the display device according to any of various preferred embodiments of the present invention described above.

In a display device according to a preferred embodiment of the present invention, at least a portion of the first conductive layer has a different work function from the second conductive layer, and therefore, an electrode potential difference is created between the first and second conductive layers. Before the display device is exposed to light, the electrode potential difference between the first and second electrodes is equal to that between the first and second conductive layers.

When a conventional display device is exposed to light, the property of the first and second polymer films thereof deteriorates optically. Thus, the potential difference between the first and second electrodes after the display device has been exposed to light is different from the original potential difference before the display device is exposed to the light. Accordingly, if the offset voltage, which was defined so as to cancel the original potential difference, is continuously applied even after the display device has been exposed to the light, another potential difference is newly created after the display device has been exposed to the light, thus deteriorating the display quality.

In contrast, in the display device according to a preferred embodiment of the present invention, the number of benzene rings included in each of the first and second polymer films is 0.4 or less for a molecular weight of 100. Thus, even when the display device is exposed to light, the first and second polymer films thereof are much less likely to deteriorate optically. Accordingly, the variation in the potential difference between the first and second electrodes before and after the exposure to light is sufficiently small. As a result, a display device that ensures good display quality and reliability can be provided.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

Embodiment 1

Figure 1:
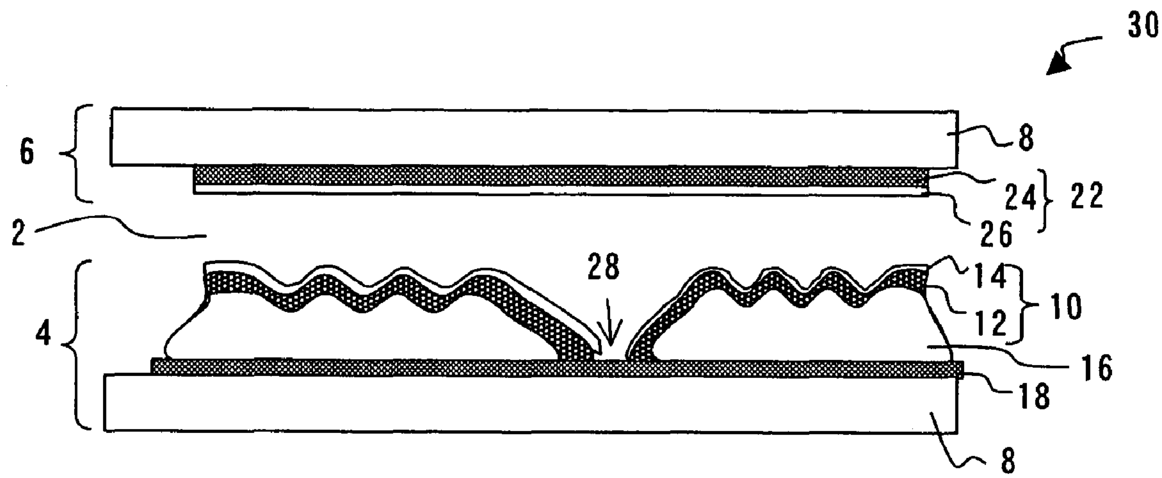
FIG. 1 is a cross-sectional view illustrating a reflective liquid crystal display device according to a first specific preferred embodiment of the present invention.

A first specific preferred embodiment of the present invention is a reflective liquid crystal display device. FIG. 1 is a cross-sectional view illustrating a reflective liquid crystal display device 30 according to the first preferred embodiment. The reflective liquid crystal display device 30 actually includes a plurality of pixels, but the following description will be focused on just one of those pixels.

As shown in FIG. 1, the reflective liquid crystal display device 30 includes a liquid crystal layer 2 and an active-matrix substrate 4 and a counter substrate 6, which are arranged so as to face each other with the liquid crystal layer 2 interposed between them.

The active-matrix substrate 4 includes a transparent substrate 8. A connector electrode 18, an interlevel dielectric film 16 and a pixel electrode (functioning as a first electrode) 10 are stacked in this order on the surface of the transparent substrate 8 so as to face the liquid crystal layer 2. The pixel electrode 10 includes a reflective conductive layer 12 and an alignment film 14, which covers the reflective conductive layer 12 and which makes contact with the liquid crystal layer 2. The reflective conductive layer 12 has reflectivity and may be made of Al, for example. Alternatively, the reflective conductive layer 12 may also be made of Ag, Cu, Cr or any other electrically conductive material with reflectivity. The alignment film 14 is provided to make liquid crystal molecules of the liquid crystal layer 2 orientate themselves in a predetermined direction, and may be made of a polymer material such as polyimide. A contact hole 28 is provided through the interlevel dielectric film 16 to electrically connect the reflective conductive layer 12 and the connector electrode 18 together. The upper surface of the interlevel dielectric film 16 is made uneven to diffuse incoming light. The reflective conductive layer 12, having a surface profile corresponding to that of the interlevel dielectric film 16, diffuses and reflects the externally incoming light.

The counter substrate 6 also includes a transparent substrate 8. A counter electrode 22 (functioning as a second electrode) is provided on the surface of the transparent substrate 8 so as to face the liquid crystal layer 2. The counter electrode 22 includes a transparent conductive layer 24 and an alignment film 26, which covers the transparent conductive layer 24 and which makes contact with the liquid crystal layer 2. The transparent conductive layer 24 may be made of ITO, which includes indium oxide and tin oxide as its main ingredients, but may also be made of any other electrically conductive material with transparency.

In this reflective liquid crystal display device 30, the transparent conductive layer 24 and the reflective conductive layer 12 are made of two different conductive materials with mutually different work functions. Thus, an electrode potential difference is created between the pixel electrode 10 and the counter electrode 22.

One of the features of this reflective liquid crystal display device 30 is that the alignment films 14 and 26 are polymer films in which the number of benzene rings included is 0.4 or less for a molecular weight of 100. With the alignment films 14 and 26 made of such a polymer, even when the liquid crystal display device 30 is exposed to light continuously, the deterioration of the alignment films 14 and 26 can be minimized. Thus, the unwanted variation in the potential difference between the pixel and counter electrodes 10 and 22, which would otherwise occur due to the exposure to incoming light, can be reduced significantly. As a result, the optically induced deterioration in display quality is substantially avoidable. It should be noted that the maximum quantity of light within which the deterioration of display quality is avoidable in a preferred embodiment of the present invention is defined as exposure to white light with an illuminance of about 100,000 lx or less for at most about 8 hours.

Hereinafter, the reflective liquid crystal display device 30 of this preferred embodiment will be described in further detail in comparison with a conventional reflective liquid crystal display device. The conventional reflective liquid crystal display device may have the same configuration as the reflective liquid crystal display device shown in FIG. 1. However, in the conventional reflective liquid crystal display device, the alignment films thereof are polymer films in which the number of benzene rings included is more than 0.4 for a molecular weight of 100.

In the reflective liquid crystal display device 30 of this preferred embodiment, the reflective conductive layer 12 of the pixel electrode 10 and the transparent conductive layer 24 of the counter electrode 22 are made of two different conductive materials as described above. Accordingly, when the reflective conductive layer 12 and the transparent conductive layer 24 are opposed, to each other, an electrode potential difference is created between the reflective conductive layer 12 and the transparent conductive layer 24. This is because the conductive materials of the reflective conductive layer 12 and the transparent conductive layer 24 have mutually different work functions.

Figure 2:
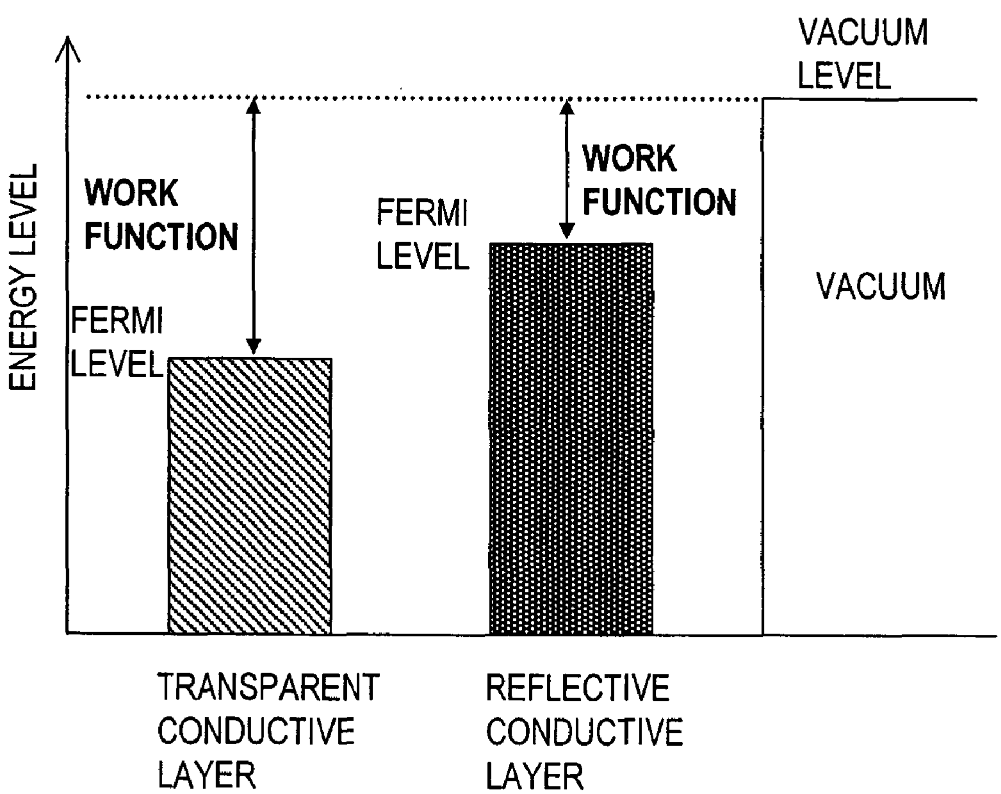
FIG. 2 schematically shows the energy levels and work functions of a reflective conductive layer and a transparent conductive layer.

FIG. 2 schematically shows the energy levels (i.e., electrode potential levels) and work functions of the reflective conductive layer 12 and the transparent conductive layer 24. Generally speaking, when T=0K, a metal has all of its energy levels filled with electrons under its Fermi level and has all of its energy levels vacated over the Fermi level. The "work function" is the least energy necessary to free an electron from inside of a metal, and is represented by the difference in energy between the vacuum level and the Fermi level of a metal as shown in FIG. 2. As can be seen from FIG. 2, the work function of the transparent conductive layer 24 is greater than that of the reflective conductive layer 12.

To compensate for the electrode potential difference resulting from the difference in work function between the reflective conductive layer 12 and the transparent conductive layer 24, a DC offset voltage is added to an AC voltage to be applied to the liquid crystal layer 2 in the reflective liquid crystal display device 30.

When a conventional reflective liquid crystal display device, in which such an offset voltage is added to the AC voltage to be applied to the liquid crystal layer, is exposed to light, the alignment films of the pixel and counter electrodes thereof deteriorate to newly create an additional potential difference between the pixel and counter electrodes. Such a conventional reflective liquid crystal display device will be described in further detail with reference to FIG. 3.

Figure 3:
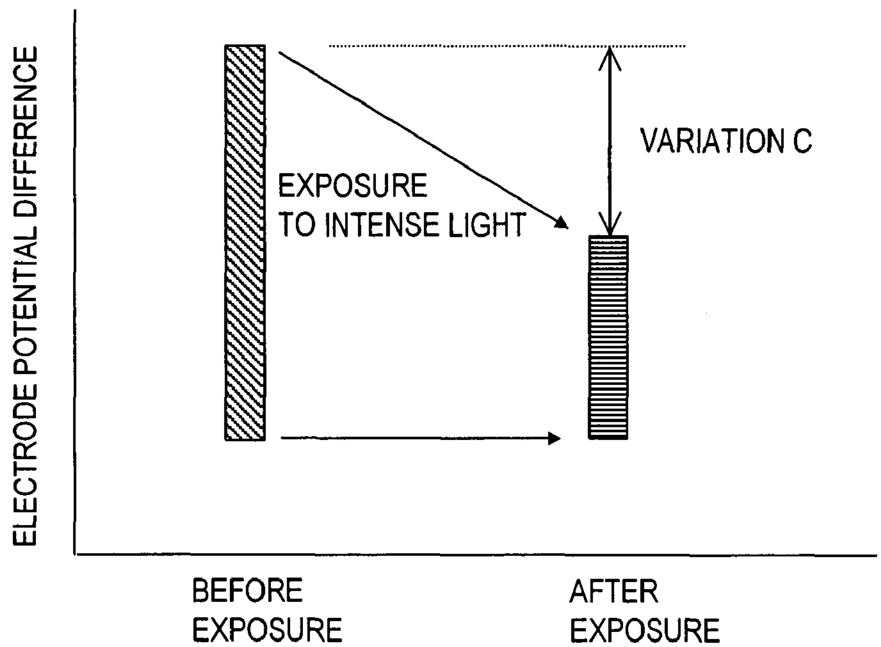
FIG. 3 schematically shows how the potential difference between pixel and counter electrodes changes in a conventional reflective liquid crystal display device when the liquid crystal layer thereof is exposed to light.

FIG. 3 schematically shows how the potential difference between the pixel and counter electrodes changes in the conventional reflective liquid crystal display device when the liquid crystal layer thereof is exposed to light. In FIG. 3, the electrode potential difference A represents the difference between the electrode potential levels of the pixel and counter electrodes before the liquid crystal layer is exposed to light, while the electrode potential difference B represents the difference between the electrode potential levels of the pixel and counter electrodes after the liquid crystal layer has been exposed to the light.

When the conventional reflective liquid crystal display device is exposed to light, the electrode potential difference between the pixel and counter electrodes thereof changes from A into B as shown in FIG. 3, which is caused by optically induced deterioration of the alignment films of the pixel and counter electrodes. Such an optically induced variation in the electrode potential difference occurs when the reflective conductive layer of the pixel electrode and the transparent conductive layer of the counter electrode have mutually different work functions.

Accordingly, when the reflective liquid crystal display device, in which a DC offset voltage is applied to cancel the electrode potential difference A, is exposed to light, another DC voltage, represented by an electrode potential difference C ($=|A-B|$), will be applied to the liquid crystal layer. In that case, a variation in brightness at short intervals (i.e., a flicker) will be produced in the conventional liquid crystal display device and the display quality thereof will deteriorate.

In contrast, in the reflective liquid crystal display device 30 of this preferred embodiment, the alignment films 14 and 26 thereof are polymer films in which the number of benzene rings included is 0.4 or less for a molecular weight of 100 as described above. In such a reflective liquid crystal display device 30, the optically induced deterioration of the alignment films 14 and 26 is minimized, and therefore, the optically induced variation in electrode potential difference between the pixel and counter electrodes 10 and 22 is reduced significantly. That is to say, the variation C in the electrode potential difference as shown in FIG. 3 is sufficiently small.

Accordingly, even if the offset voltage, which was defined to cancel the electrode potential difference between the pixel and counter electrodes 10 and 22 before the liquid crystal display device was exposed to light, is continuously applied after the device has been exposed to the light, almost no electrode potential difference will be newly created between the pixel and counter electrodes 10 and 22. Thus, no DC voltage will be newly applied to the liquid crystal layer, and the deterioration of the display quality can be minimized.

Next, it will be described by reference to experimental results why the deterioration of display quality is minimized by defining the density of benzene rings of the alignment films within the range specified above.

Figure 4:
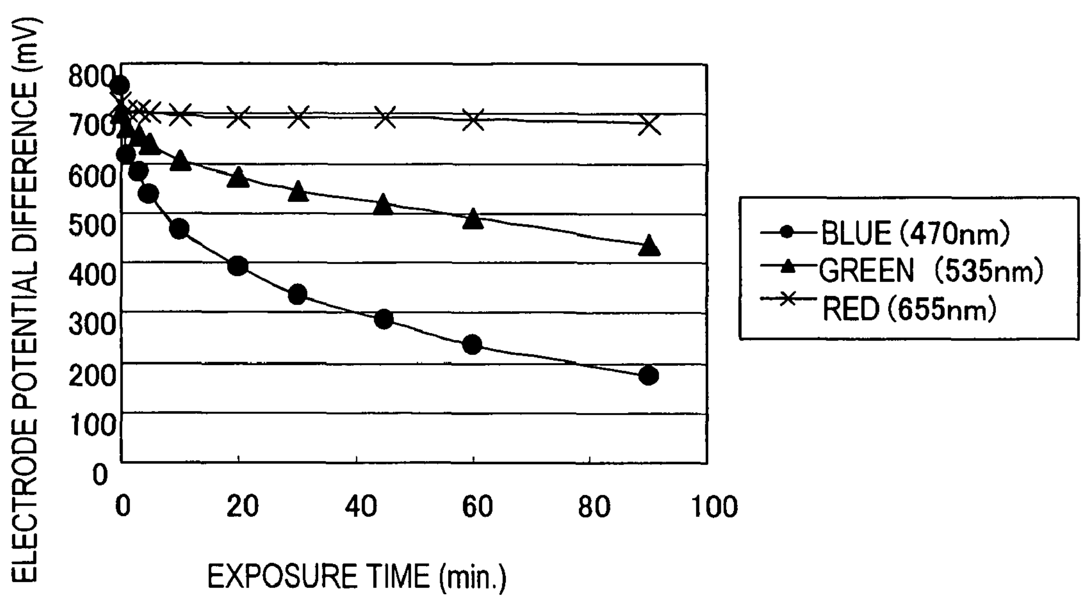
FIG. 4 is a graph showing how the potential difference between the pixel and counter electrodes changes with the time in which the display device is exposed to light.

The present inventors carried out experiments to find out the specific wavelength range of incoming light that caused deterioration in the quality of the alignment films in the liquid crystal display device described above. Specifically, the liquid crystal display device was exposed to a blue light ray with a wavelength of about 470 nm, a green light ray with a wavelength of about 535 nm and a red light ray with a wavelength of about 655 nm, respectively. FIG. 4 shows how the electrode potential difference between the pixel and counter electrodes 10 and 22 changed with time when the liquid crystal display device was exposed to those light rays separately. In FIG. 4, the ordinate represents the electrode potential difference between the pixel and counter electrodes 10 and 22 and the abscissa represents the time in which the liquid crystal display device was exposed to each of those light rays. The variation in the electrode potential difference was detected by a flicker minimization method to be described later. The blue and green light rays were emitted from NSPB 500S with $\phi=5$ and NSPG 500S with $\phi=5$ (both of which were produced by Nichia Corp.), respectively, while the red light ray was emitted from H-3000L (produced by Stanley Electric Co., Ltd).

As can be seen from the results shown in FIG. 4, the electrode potential difference changed significantly when the liquid crystal display device was exposed to visible radiation (to a light ray with a relatively short wavelength, in particular). Thus, to reduce the variation in the electrode potential difference sufficiently, the absorption of visible radiation (or a light ray with a relatively short wavelength among other things) into the alignment films needs to be minimized.

Figure 5:
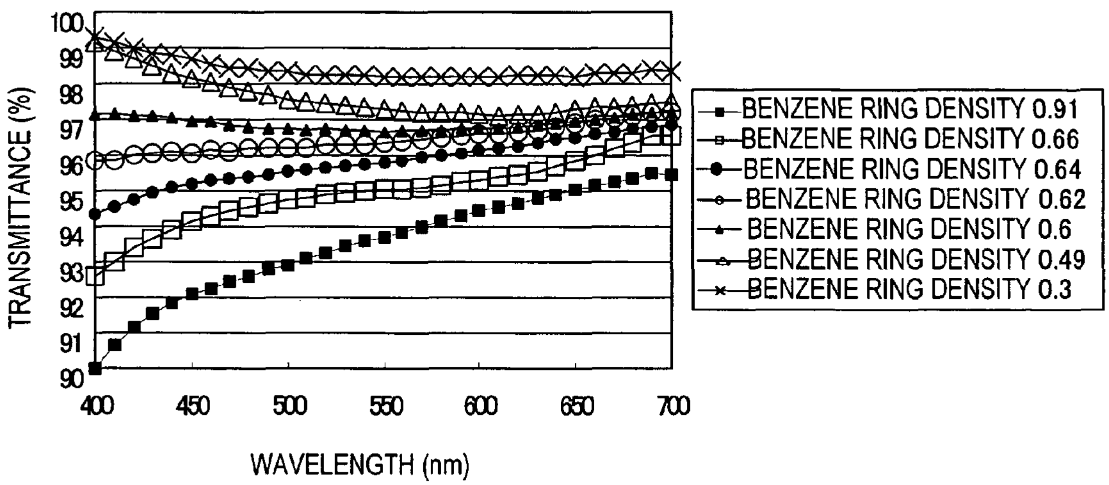
FIG. 5 is a graph showing how the transmittance of an alignment film changes with the wavelength.

The present inventors further carried out experiments to see how the spectral characteristics of the liquid crystal display device changed when alignment films with a benzene ring density were replaced with alignment films with a different benzene ring density. As used herein, the "benzene ring density" is defined by the number of benzene rings included for a molecular weight of 100. The results are shown in FIG. 5. In FIG. 5, the ordinate represents the transmittance of the alignment films and the abscissa represents the wavelength. As shown in FIG. 5, when the incoming light ray belongs to a short wave portion of the visible radiation range, the degree of absorption of the incoming light ray changes significantly with the benzene ring density. Specifically, in that short wave range, the lower the benzene ring density, the lower the degree of absorption of the incoming light ray with the relatively short wavelength. It should be noted that the results shown in FIG. 5 were obtained from alignment films with a thickness of about 1,000 Å.

Figure 6:
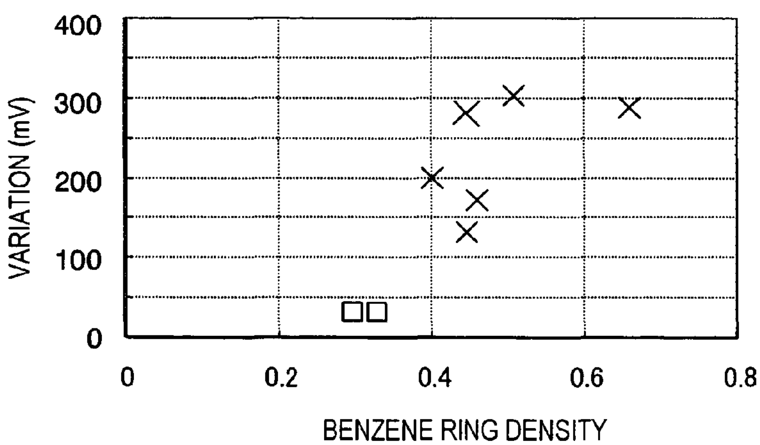
FIG. 6 is a graph showing how the potential difference between the pixel and counter electrodes changes with the density of benzene rings in an alignment film.

Furthermore, the present inventors also carried out experiments to see how the variation in electrode potential difference between the pixel electrode 10 and the counter electrode 22 before and after the liquid crystal display device was exposed to light was affected by the benzene ring density of the alignment films. The variation in electrode potential difference was also detected by a flicker minimization method to be described later. The results are shown in FIG. 6. As can be seen from FIG. 6, when the benzene ring density was relatively low, the variation in electrode potential difference was relatively small.

As a result of the experiments to be described below, it was discovered that the magnitude of the minimum variation in electrode potential difference, at or over which the viewer perceived a flicker, changed according to the drive frequency of the liquid crystal display device.

Specifically, the minimum variations in electrode potential difference, at or over which the flicker was perceivable, were detected with the drive frequency of the reflective liquid crystal display device 30 changed within the range of about 3 Hz to about 70 Hz. The drive frequency of the reflective liquid crystal display device 30 was changed by applying a voltage to the reflective liquid crystal display device 30 and changing the output frequency of an arbitrary wave generator.

With the drive frequency set equal to or higher than about 60 Hz, when the electrode potential difference between the pixel and counter electrodes 10 and 22 changed by more than about 250 mV, a flicker was perceivable. On the other hand, with the drive frequency set equal to or lower than about 45 Hz, when the electrode potential difference between the pixel and counter electrodes 10 and 22 changed by more than about 30 mV, a flicker was perceivable. As the drive frequency was gradually decreased from about 70 Hz, the minimum variation in electrode potential difference, at or over which a flicker was perceivable, also decreased gradually. And when the drive frequency was around 45 Hz, the minimum variation in electrode potential difference, at or over which a flicker was perceivable, changed steeply and continuously. It was discovered that the lower the drive frequency of the liquid crystal display device, the smaller the minimum variation in electrode potential difference at or under which a flicker was perceivable.

The results of these experiments revealed that when the drive frequency of the reflective liquid crystal display device 30 was about 60 Hz, a normal value, (i.e., when a voltage applied to the liquid crystal layer 2 of the reflective liquid crystal display device 30 for display purposes was updated at a frequency of about 60 Hz), a reflective liquid crystal display device, in which no flicker was perceivable, could be provided by defining the variation in electrode potential difference between the pixel and counter electrodes 10 and 22 within ±250 mV. Thus, as can be seen from the results shown in FIG. 6, such a flicker-free reflective liquid crystal display device can be obtained by defining the benzene ring density in the alignment films of the pixel and counter electrodes 10 and 22 at about 0.4 or less.

Also, as shown in FIG. 5, the alignment films with a benzene ring density of about 0.4 or less exhibited a transmittance of about 97% or more with respect to an incoming light ray having a wavelength of about 400 nm to about 500 nm. Thus, it was discovered that when the alignment films of the pixel and counter electrodes 10 and 22 had a thickness of about 500 Å to about 1,500 Å, the transmittance thereof was preferably about 97% or more.

The results of the experiments also revealed that when the drive frequency of the reflective liquid crystal display device 30 was about 45 Hz, which is normally adopted in a low-frequency drive method, (i.e., when a voltage applied to the liquid crystal layer 2 of the reflective liquid crystal display device 30 for display purposes was updated at a frequency of about 45 Hz), a flicker-free reflective liquid crystal display device could be provided by defining the variation in electrode potential difference between the pixel and counter electrodes 10 and 22 within ±30 mV. Thus, as can be seen from the results shown in FIG. 6, such a flicker-free reflective liquid crystal display device can be obtained by defining the benzene ring density in the alignment films of the pixel and counter electrodes 10 and 22 at about 0.4 or less. Also, as shown in FIG. 5, the alignment films with a benzene ring density of about 0.4 or less exhibited a transmittance of about 97% or more with respect to an incoming light ray having a wavelength of about 400 nm to about 500 nm.

The relationship between the drive frequency and the flicker perceivability also depends on the arrangement of pixels. In the specific example described above, the relationship between the drive frequency and the flicker perceivability is associated with a striped arrangement of pixels. Thus, where the pixels are arranged in a delta arrangement pattern or in any other pattern that makes the flicker hardly perceivable, no flicker may be perceivable even if the variation in electrode potential difference between the pixel and counter electrodes 10 and 22 exceeds the value specified above. Accordingly, a preferred benzene ring density range of the alignment films is changeable with the specific arrangement of the pixels.

By modifying the pixel arrangement, the flicker perceivability can be decreased. However, it is still true that the lower the drive frequency, the more easily the flicker is perceived (even if the variation in electrode potential difference between the pixel and counter electrodes 10 and 22 is small). The relationship between the drive frequency and the flicker perceivability also depends on the visual acuity of the individual viewer. That is to say, the absolute value of the variation in electrode potential difference between the pixel and counter electrodes 10 and 22, at or over which the flicker is perceivable, slightly changes according to the visual acuity of the human viewer. Thus, a person with relatively high visual acuity tends to perceive a flicker at a relatively small variation.

The flicker perceivability further depends on the transmittance of the liquid crystal display device. In the specific example described above, where the liquid crystal display device has a drive frequency of about 60 Hz, a variation of about ±250 mV or more in the electrode potential difference between the pixel and counter electrodes 10 and 22 should allow the viewer to perceive a flicker with his or her own eyes. On the other hand, where the liquid crystal display device has, a drive frequency of about 45 Hz, a variation of about ±30 mV or more in the electrode potential difference-between the pixel and counter electrodes 10 and 22 should allow the viewer to perceive a flicker with his or her own eyes. These results were obtained when a grey scale tone was displayed on the liquid crystal display device. Hereinafter, a relationship between the transmittance of the liquid crystal display device and the flicker perceivability will be described with reference to FIG. 7.

Figure 7:
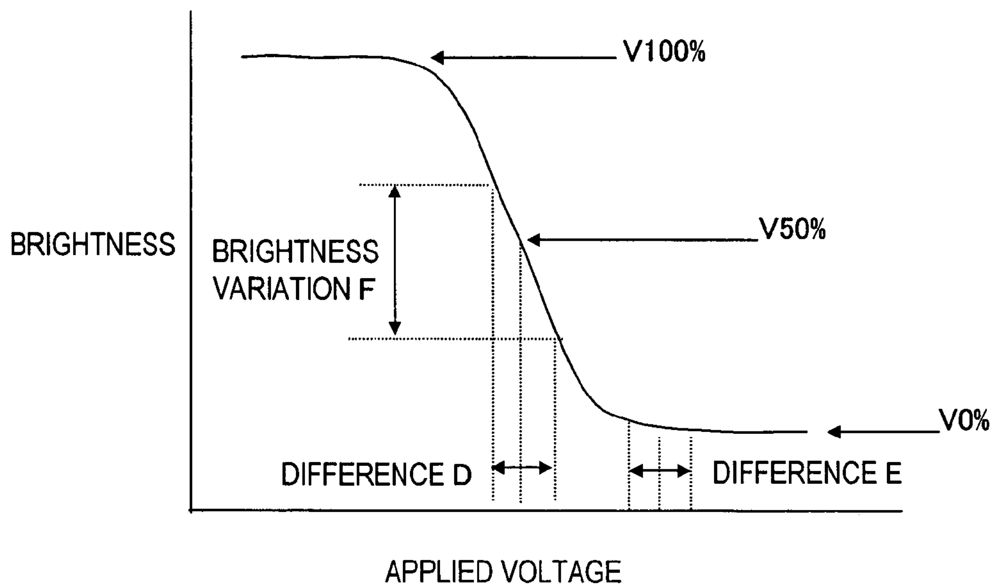
FIG. 7 is a graph showing the transmittance characteristic of a reflective liquid crystal display device.

FIG. 7 is a graph showing the voltage-transmittance characteristic of a liquid crystal display device. In FIG. 7, the ordinate represents the transmittance (or brightness) while the abscissa represents the voltage. In the following description, a bright state of the liquid crystal panel will be identified by "V 100%", while a dark state thereof will be identified by "V 0%".

If a flicker is sensed as a variation in brightness in a V 50% state representing a grey scale tone, the flicker is perceivable more easily than around the V 100% state or around the V 0% state. The reason is as follows. Suppose asymmetric voltages are applied to a display device. In that case, even if the difference E between the asymmetric voltages around the V 0% state or the V 100% state is equal to the difference D between the asymmetric voltages around the V 50% state, the variation F in brightness around the V 50% state is much greater than the variation in brightness around the V 0% state or the V 100% state as shown in FIG. 7.

Thus, a flicker is most preferably observed at a grey scale tone (i.e., in the V 50% state), and the variation in electrode potential difference between the pixel and counter electrodes 10 and 22 was measured in this preferred embodiment in the V 50% state representing a grey scale tone. Accordingly, the results shown in FIG. 6 were also obtained by applying such a voltage as to decrease the brightness of the reflective liquid crystal display device 30 to the V 50% state and by calculating the variation in electrode potential difference, resulting from the deterioration of the alignment films when the reflective liquid crystal display device 30 was exposed to light, by a flicker minimization method to be described later.

In the display device of this preferred embodiment, when the drive frequency was about 60 Hz, the critical variation in electrode potential difference, at or over which a flicker was perceivable, was about 250 mV. On the other hand, when the drive frequency was about 45 Hz, the critical variation in electrode potential difference, at or over which a flicker was perceivable, was about 30 mV. Also, this display device had a grey scale tone voltage (i.e., representing the V 50% state) of about 2.5 V. Accordingly, the critical variation for the drive frequency of about 60 Hz was about 10% of the grey scale tone voltage and the critical variation for the drive frequency of about 45 Hz was about 1.2% of the grey scale tone voltage. The critical variation in electrode potential difference, at or over which a flicker is perceivable, is changeable with the voltage-transmittance characteristic unique to the display device (see FIG. 7). In general, if the drive frequency is about 60 Hz, the critical variation is preferably about 10% or less of the grey scale tone voltage. On the other hand, if the drive frequency is about 45 Hz, the critical variation is preferably about 2% or less, more preferably about 1.2% or less, of the grey scale tone voltage.

Figure 8:
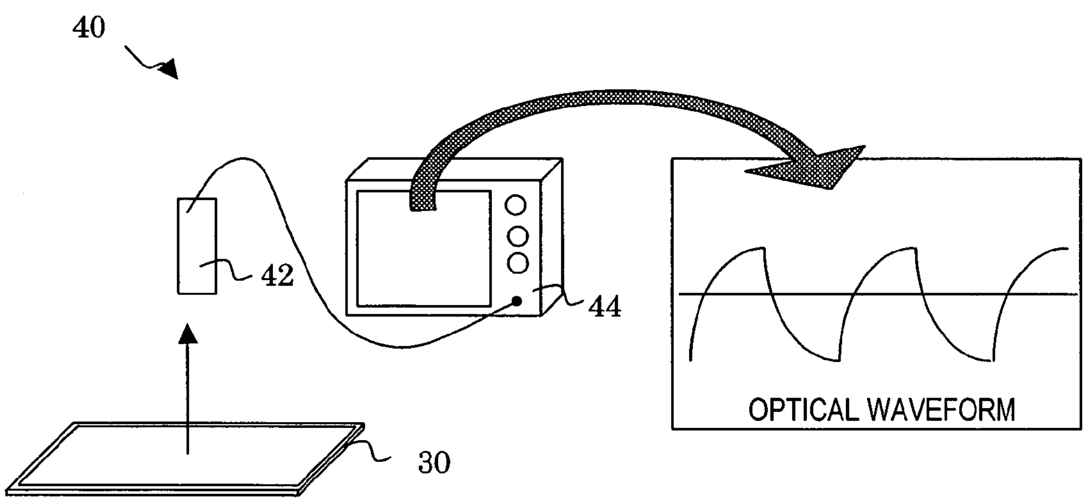
FIG. 8 schematically illustrates a flicker detector.

Hereinafter, a flicker minimization method will be described with reference to FIG. 8, which schematically illustrates a flicker detector.

First, a flicker is detected, and transformed into a voltage, by a photodetector 42 such as a photomultimeter. Next, the optical wave that has been transformed into the voltage is input to a digital oscilloscope 44 or any other similar apparatus so as to be drawn as a visible waveform on the display thereof. In this manner, the flicker, which is a variation in brightness, is drawn as a sawtooth-like optical waveform as shown in FIG. 8. To remove asymmetric components from this waveform, a DC voltage is added as an offset voltage to an AC voltage that is being applied for display purposes. Such an offset voltage is defined so as to minimize the amplitude of the optical waveform being drawn on the digital oscilloscope, for example. By adding the offset voltage, the asymmetric components, representing the electrode potential difference between the pixel and counter electrodes 10 and 22, are removed.

The results shown in FIG. 6 may be obtained by the flicker minimization method in the following manner.

First, a number of reflective liquid crystal display devices 30, including alignment films 14 and 26 with various benzene ring densities, are prepared. Next, before each of those liquid crystal display devices 30 is exposed to light, the offset voltage to be added thereto is defined by the flicker minimization method. Then, the offset voltage defined is added to the voltage being applied to each liquid crystal display device 30 for display purposes. Since the reflective conductive layer 12 and the transparent conductive layer 24 thereof have mutually different work functions, this offset voltage represents the electrode potential difference to be created between the pixel and counter electrodes 10 and 22. Thus, by adding the offset voltage, the asymmetric components can be removed from the voltage being applied to the reflective liquid crystal display device 30.

Subsequently, the reflective liquid crystal display devices 30, to each of which its associated offset voltage is being applied, are exposed to the same quantity of light for the same amount of time. As a result of the exposure to the light, another electrode potential difference is newly produced between the pixel electrode 10 and the counter electrode 22. This electrode potential difference changes with the benzene ring density in its associated alignment films. Thus, another offset voltage needs to be defined again by the flicker minimization method so as to cancel this electrode potential difference. This offset voltage represents the optically induced variation in electrode potential difference as plotted as ordinates in FIG. 6.

In these experiments, the environment surrounding the liquid crystal display device was controlled as if the device were exposed to direct sunlight outdoors on a fine day. In such a situation, the liquid crystal display device would be exposed to the sunlight at an illuminance of approximately 100,000 lx. Also, in these experiments, a fluorescent lamp, having a wavelength characteristic that was quite similar to those of external light, was used to simulate the sunlight. The fluorescent lamp may be a three-wavelength tubular fluorescent lamp. Specifically, a desktop fluorescent lamp unit LS-U228 (produced by Sharp Corp.) with a lamp FPL27EX-N (25 W) was used. To control the illuminance on the liquid crystal display device, the distance between the light source and the liquid crystal display device and/or the intensity of the light source were adjusted (by exchanging lamps). In this manner, the experiments were carried out such that the illuminance on the liquid crystal display device was as if the device were exposed to direct sunlight. In this specific example, a fluorescent lamp was used. Alternatively, any other lamp may also be used as long as the lamp has a wavelength characteristic that is similar to that of external light. The results shown in FIG. 6 were obtained in this manner.

Embodiment 2

The first specific preferred embodiment of the present invention described above is a reflective liquid crystal display device. However, a second specific preferred embodiment of the present invention to be described below is a semi-transmissive liquid crystal display device. In the following description of the second preferred embodiment, each member having substantially the same function as the counterpart of the liquid crystal display device 30 shown in FIG. 1 will be identified by the same reference numeral and the description thereof will be omitted herein.

Figure 9:
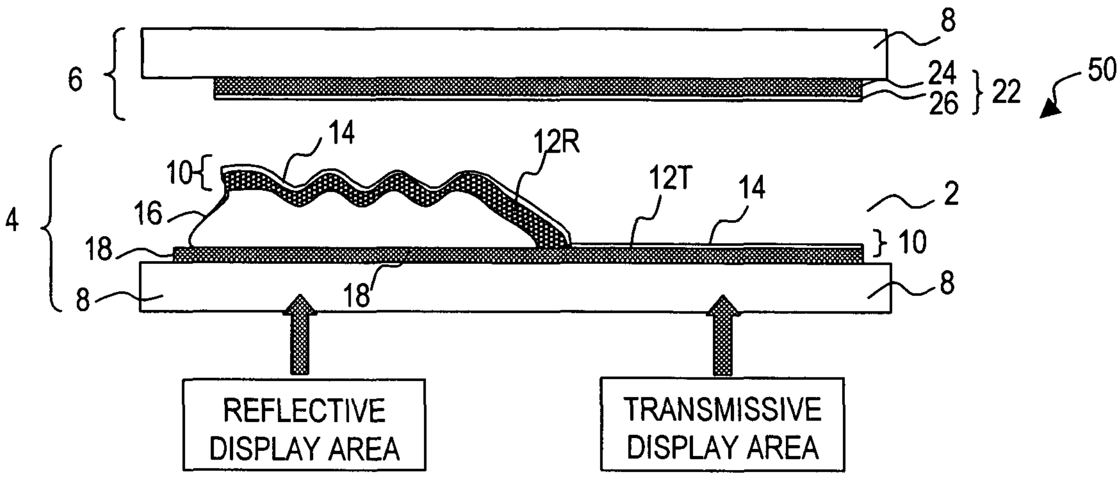
FIG. 9 is a cross-sectional view illustrating a semi-transmissive liquid crystal display device according to a second specific preferred embodiment of the present invention.
Figure 10:
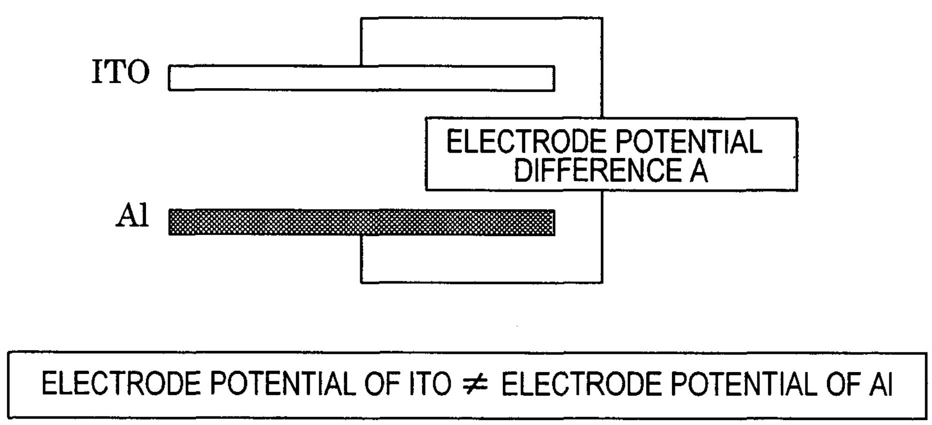
FIG. 10 schematically shows how a potential difference is created between two opposed electrodes.

FIG. 9 is a cross-sectional view illustrating a semi-transmissive liquid crystal display device 50 according to the second preferred embodiment. For further details of the semi-transmissive liquid crystal display device 50, see Japanese Laid-Open Publication No. 11-101992, for example.

As shown in FIG. 9, the semi-transmissive liquid crystal display device 50 includes a liquid crystal layer 2 and an active-matrix substrate 4 and a counter substrate 6, which are arranged so as to face each other with the liquid crystal layer 2 interposed between them.

The active-matrix substrate 4 includes a pixel electrode 10. The pixel electrode 10 includes a reflective conductive layer 12R, a transparent conductive layer 12T, and an alignment film 14, which covers both the reflective and transparent conductive layers 12R and 12T and which makes contact with the liquid crystal layer 2. Since the pixel electrode 10 includes the reflective conductive layer 12R and the transparent conductive layer 12T, the semi-transmissive liquid crystal display device 50 can conduct a display operation both in a reflection mode and in a transmission mode. The transparent conductive layer 12T may be made of ITO, for example. The display operation is conducted in the transmission mode where the transparent conductive layer 12T is provided. The reflective conductive layer 12R may be made of Al, for example. The display operation is conducted in the reflection mode where the reflective conductive layer 12R is provided.

On the other hand, the counter substrate 6 includes a counter electrode 22. The counter electrode 22 includes a transparent conductive layer 24 and an alignment film 26, which covers the transparent conductive layer 24 and which makes contact with the liquid crystal layer 2. The transparent conductive layer 24 may be made of ITO, for example.

As already described for the first preferred embodiment, the transparent and reflective conductive layers may also be made of various other conductive materials.

In this semi-transmissive liquid crystal display device 50, the reflective conductive layer 12R and the transparent conductive layer 24 are made of two different conductive materials with mutually different work functions. Thus, an electrode potential difference is created between the pixel electrode 10 and the counter electrode 22.

As in the first preferred embodiment described above, the alignment films 14 and 26 are polymer films in which the number of benzene rings included is 0.4 or less for a molecular weight of 100. Thus, even when this liquid crystal display device 50 is exposed to light, the deterioration of the alignment films 14 and 26 is minimized. As a result, the optically induced variation in electrode potential difference between the pixel and counter electrodes 10 and 22 can be reduced significantly.

Accordingly, even if the offset voltage, which was defined to cancel the electrode potential difference between the pixel and counter electrodes 10 and 22 before the liquid crystal display device was exposed to light, is continuously applied after the device has been exposed to the light, almost no electrode potential difference will be newly created between the pixel and counter electrodes 10 and 22. Thus, no DC voltage will be newly applied to the liquid crystal layer, and the deterioration of the display quality can be minimized.

The first and second specific preferred embodiments of the present invention described above are a reflective liquid crystal display device and a semi-transmissive liquid crystal display device, respectively. However, the present invention is also applicable for use in any other type of liquid crystal display device as long as the two electrodes thereof, which are arranged so as to face each other with a liquid crystal layer interposed between them, include respective conductive layers with mutually different work functions.

Also, the two polymer films as the alignment films for the two opposed electrodes may be made of either the same material or mutually different materials as long as the benzene ring densities thereof are within the range specified above. However, if the alignment films are made of different materials, then adsorption of impurities and other problems may arise. Thus, the two polymer films are preferably made of the same material.

Furthermore, the present invention is applicable for use in not just liquid crystal display devices but also various other types of display devices if the two electrodes thereof, opposed to each other with a display medium layer interposed between them, include respective conductive layers with mutually different work functions. Examples of such alternative display devices include an electrophoretic display device and a toner display device.

In a display device according to any of various preferred embodiments of the present invention described above, even when two electrodes thereof are arranged so as to face each other with a display medium layer interposed between them and include conductive layers with mutually different work functions, optically induced deterioration in display quality can be minimized.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A display device comprising:

a display medium layer; and a first electrode and a second electrode, which face each other with the display medium layer interposed between them, wherein the first electrode includes: a first conductive layer; and a first polymer film, which covers the first conductive layer and which makes contact with the display medium layer, wherein the second electrode includes: a second conductive layer; and a second polymer film, which covers the second conductive layer and which makes contact with the display medium layer, wherein the first and second polymer films are alignment films, and the first and second polymer films directly contact the first and second electrodes, respectively;

wherein at least a portion of the first conductive layer has a different work function from the second conductive layer, and wherein a variation in potential difference between potential levels of the first and second electrodes right after the device has been exposed to light is about 10% or less of a voltage that is applied to display a grey-scale tone.

2. A display device comprising:

a display medium layer;

a first electrode and a second electrode, which face each other with the display medium layer interposed between them, wherein the first electrode includes: a first conductive layer; and a first polymer film, which covers the first conductive layer and which makes contact with the display medium layer, wherein the second electrode includes: a second conductive layer; and a second polymer film, which covers the second conductive layer and which makes contact with the display medium layer, wherein at least a portion of the first conductive layer has a different work function from the second conductive layer, wherein a variation in potential difference between potential levels of the first and second electrodes right after the device has been exposed to light is about 10% or less of a voltage that is applied to display a grey-scale tone, wherein the display medium layer includes a liquid crystal material, and wherein the variation in potential difference has an absolute value of at most about 250 mV.

3. The device of claim 2, wherein the variation in potential difference has an absolute value of at most about 30 mV.

4. A display device comprising:

a display medium layer;

a first electrode and a second electrode, which face each other with the display medium layer interposed between them, wherein the first electrode includes: a first conductive layer; and a first polymer film, which covers the first conductive layer and which makes contact with the display medium layer, wherein the second electrode includes: a second conductive layer; and a second polymer film, which covers the second conductive layer and which makes contact with the display medium layer, wherein at least a portion of the first conductive layer has a different work function from the second conductive layer, wherein a variation in potential difference between potential levels of the first and second electrodes right after the device has been exposed to light is about 10% or less of a voltage that is applied to display a grey-scale tone, and wherein the number of benzene rings included in each of the first and second polymer films is 0.4 or less for a molecular weight of 100.

5. The device of claim 1, wherein the first and second polymer films exhibit a transmittance of about 97% or more with respect to incoming light having a wavelength of about 400 nm to about 500 nm.

6. The device of claim 1, wherein the first conductive layer is a reflective conductive layer and the second conductive layer is a transparent conductive layer.

7. The device of claim 6, further comprising another transparent conductive layer, which is provided as a third conductive layer in the first electrode.

8. The device of claim 2, wherein the first and second polymer films are alignment films.

9. The device of claim 1, wherein a voltage being applied to the display medium layer for display purposes is updated at a frequency of about 45 Hz or less.

10. The device of claim 6, wherein the transparent conductive layer includes ITO, and the reflective conductive layer includes Al.

11. The device of claim 1, wherein an AC voltage, which includes an additional offset voltage and which changes its polarity at regular intervals, is applied to the display medium layer.

12. A mobile electronic appliance comprising the display device of claim 1.

13. The device of claim 4, wherein the first and second polymer films exhibit a transmittance of about 97% or more with respect to incoming light having a wavelength of about 400 nm to about 500 nm.

14. The device of claim 4, wherein the first conductive layer is a reflective conductive layer and the second conductive layer is a transparent conductive layer.

15. The device of claim 4, further comprising another transparent conductive layer, which is provided as a third conductive layer in the first electrode.

16. The device of claim 4, wherein the first and second polymer films are alignment films.

17. The device of claim 4, wherein a voltage being applied to the display medium layer for display purposes is updated at a frequency of about 45 Hz or less.

18. The device of claim 14, wherein the transparent conductive layer includes ITO, and the reflective conductive layer includes Al.

19. The device of claim 4, wherein an AC voltage, which includes an additional offset voltage and which changes its polarity at regular intervals, is applied to the display medium layer.

20. A mobile electronic appliance comprising the display device of claim 4.

21. The device of claim 4, wherein the display medium layer includes a liquid crystal material, and wherein the variation in potential difference has an absolute value of at most about 250 mV.

22. The device of claim 21, wherein the variation in potential difference has an absolute value of at most about 30 mV.

* * * * *